(12) United States Patent
Bhonsle et al.

(10) Patent No.: US 11,811,791 B2
(45) Date of Patent: Nov. 7, 2023

(54) GENERATIVE ADVERSARIAL NETWORK BASED PREDICTIVE MODEL FOR COLLABORATIVE INTRUSION DETECTION SYSTEMS

(71) Applicant: VMware, Inc., Palo Alto, CA (US)

(72) Inventors: Makarand Bhonsle, Mountain View, CA (US); Sirisha Myneni, Santa Clara, CA (US); Anirban Sengupta, Saratogo, CA (US); Subrahmanyam Manuguri, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 792 days.

(21) Appl. No.: 16/738,305

(22) Filed: Jan. 9, 2020

(65) Prior Publication Data

US 2021/0218757 A1 Jul. 15, 2021

(51) Int. Cl.
*G06F 21/00* (2013.01)
*H04L 9/40* (2022.01)
*G06F 17/18* (2006.01)
*G06F 21/56* (2013.01)
*G06N 3/045* (2023.01)
*G06N 3/047* (2023.01)

(52) U.S. Cl.
CPC .......... *H04L 63/1416* (2013.01); *G06F 17/18* (2013.01); *G06F 21/564* (2013.01); *G06N 3/045* (2023.01); *G06N 3/047* (2023.01)

(58) Field of Classification Search
CPC ... H04L 63/1416; G06F 17/18; G06F 21/564; G06F 21/554; G06N 3/0454; G06N 3/0472; G06N 3/088
See application file for complete search history.

(56) References Cited

U.S. PATENT DOCUMENTS

| 2004/0255157 A1* | 12/2004 | Ghanea-Hercock ......................... H04L 63/1408 726/23 |
| 2014/0047544 A1* | 2/2014 | Jakobsson .............. G06F 21/566 726/23 |
| 2018/0336439 A1* | 11/2018 | Kliger .................... G06N 3/088 |
| 2019/0042878 A1* | 2/2019 | Sheller .................. G06K 9/6269 |

(Continued)

FOREIGN PATENT DOCUMENTS

| CN | 1770700 A | * | 5/2006 | |
| CN | 108123931 A | * | 6/2018 | ......... H04L 63/0236 |

(Continued)

*Primary Examiner* — Michael M Lee
(74) *Attorney, Agent, or Firm* — Patterson + Sheridan, LLP (57) ABSTRACT

Described herein are embodiments for transferring knowledge of intrusion signatures derived from a number of software-defined data centers (SDDCs), each of which has an intrusion detection system (IDS) with a convolutional neural network (CNN) to a centralized neural network. The centralized neural network is implemented as a generative adversarial neural network (GANN) having a multi-feed discriminator and a generator, which is trained from the discriminator. Knowledge in the GANN is then transferred back to the CNNs in each of the SDDCs. In this manner, each CNN obtains the learning of the CNNs in nearby IDSs of a region so that a distributed attack on each of the CNNs, such as a denial of service attack, can be defended by each of the CNNs.

20 Claims, 9 Drawing Sheets

(56) References Cited

U.S. PATENT DOCUMENTS

| | | | |
|---|---|---|---|
| 2019/0147343 A1* | 5/2019 | Lev | G06F 17/18 |
| | | | 706/25 |
| 2020/0252296 A1* | 8/2020 | Lashyn | G06N 3/0454 |
| 2020/0342104 A1* | 10/2020 | Palisse | G06F 21/554 |
| 2021/0204152 A1* | 7/2021 | Vasudevan | H04L 47/2441 |
| 2021/0216857 A1* | 7/2021 | Zhang | G06N 3/08 |
| 2021/0319113 A1* | 10/2021 | Cheng | G06F 21/577 |

FOREIGN PATENT DOCUMENTS

| | | | | |
|---|---|---|---|---|
| CN | 109002715 A | * | 12/2018 | G06F 21/562 |
| CN | 110889509 A | * | 3/2020 | |

\* cited by examiner

GENERATIVE ADVERSARIAL NETWORK BASED PREDICTIVE MODEL FOR COLLABORATIVE INTRUSION DETECTION SYSTEMS

BACKGROUND

Virtualized network solutions such as the VMware NSX suite come with state-of-the-art and powerful firewall and intrusion detection systems (IDSs). These security systems are very effective in detecting and preventing network attacks. But these systems are localized to a single data center (e.g., software defined data center (SDDC)). If several SDDCs in a region are linked to each other, an intrusion detection or prevention at one SDDC may not apply to the other linked SDDCs, which may have different types of attacks, each of which is part of a coordinated distributed attack. It is desirable to pool the collective knowledge of attacks at multiple linked SDDC sites of a region so that each SDDC has the same ability to detect and defend itself.

DETAILED DESCRIPTION

Described herein is a centralized deep generative adversarial neural network (DCGANN) that receives knowledge from a plurality of local convolution neural networks (CNNs), each operating in an intrusion detection system (IDS) of a software defined data center (SDDC) in a region of many linked SDDCs. Thus, the DCGANN has the combined learning of all of the local CNNs which have been exposed to local intrusion attacks. The combined learning of the DCGANN is distributed back to all of the local CNNs so that each local CNN has its own knowledge as well as the knowledge of all of the other CNNs in the region. If and when a distributed attack targeting all of the CNNs in the region occurs, each CNN has the knowledge to counter the attack.

Figure 1:
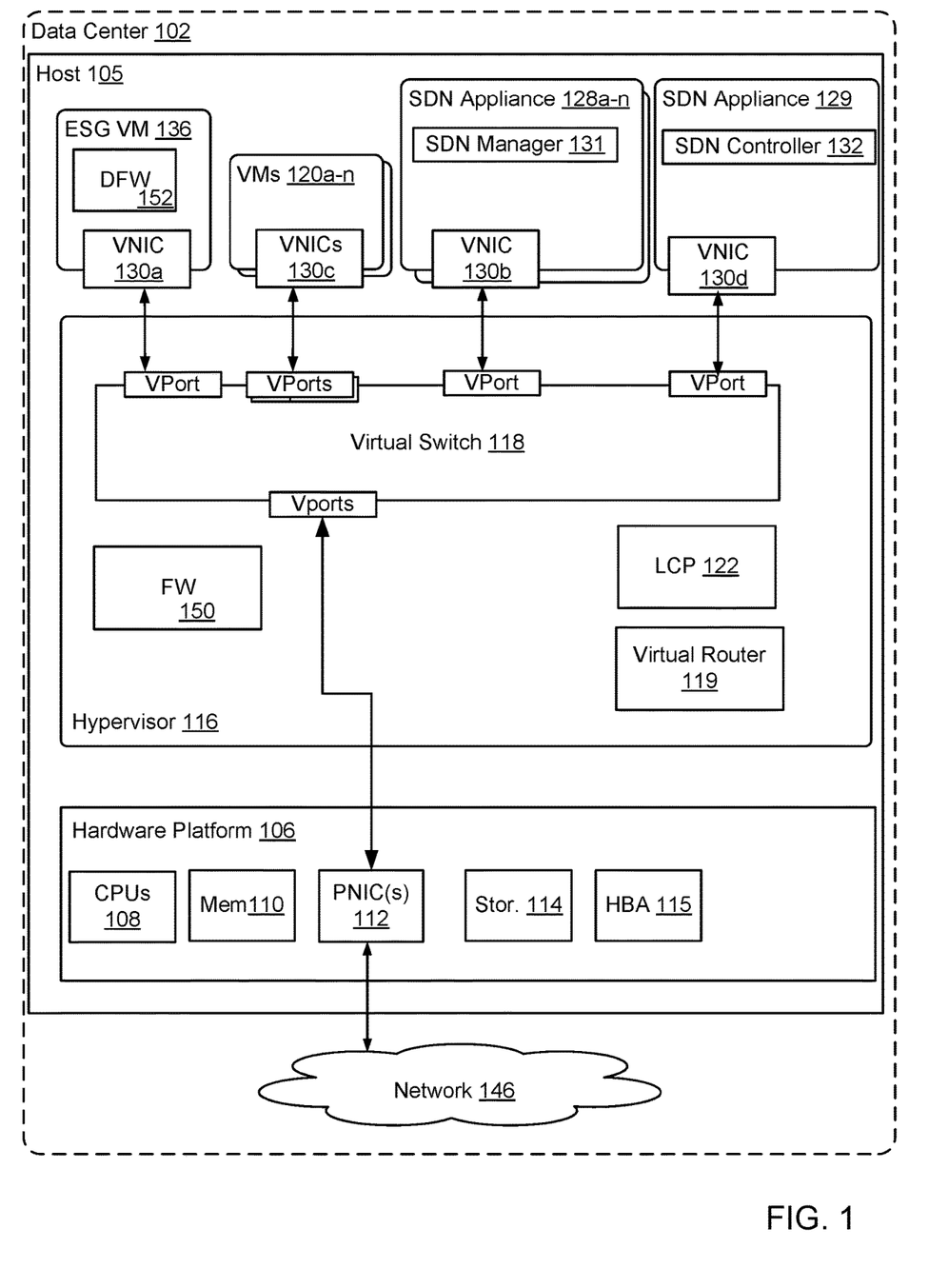
FIG. 1 depicts a software-defined data center (SDDC) with an intrusion detection system.

FIG. 1 depicts a software-defined data center (SDDC) with an intrusion detection system. The figure depicts a block diagram of a host 105 that has been configured with a software defined networking (SDN) solution. Host 105 is part of a data center 102, which may be an on-premises data center or a cloud data center. Although not shown, data center 102 includes other hosts that, in some examples, are interconnected using network 146, such as a local area network (LAN). Network 146 serves as the physical underlay network of data center 102. Hosts 105 in data center 102 may be geographically co-located servers on the same rack or on different racks in any arbitrary location in data center 102.

In addition, data center 102 includes a management plane and a control plane. For example, the management plane in host 105 includes SDN virtual appliances 128a-n, one of which includes an SDN Manager 131. The control plane includes an SDN virtual appliance 129, which includes an SDN controller 132. The management plane is concerned with receiving network configuration input from an administrator or other entity via Web or API interfaces and generating desired state data so that the control plane can determine one or more logical networks, including topologies, for data center 102. The control plane is concerned with determining the logical overlay network topology and maintaining information about network entities such as logical switches, logical routers, and endpoints, etc. The logical topology information received from the management plane is translated by the control plane into network configuration data that is then communicated to network elements of each host 105. The network configuration data, for example, includes forwarding table entries to populate forwarding tables at virtual switch(es), route tables at virtual router(s), etc. provided by the hypervisor deployed on each host 105, and configuration information such as Layer 2 (MAC) addresses for interfaces such as VNICs and virtual interfaces, etc. The management plane and control plane each may be implemented as single entities or may be implemented as distributed or clustered applications or components. For example, a management plane may include multiple computing devices or VCIs that implement management plane functions, and a control plane may include multiple central (or distributed) controller computers, VCIs, or processes that implement control plane functions.

Host 105 is configured to provide a virtualization layer, also referred to as a hypervisor 116, which virtualizes processor, memory, storage, and networking resources of hardware platform 106 to become multiple virtual machines, e.g., VM 120. VMs on the same host 105 may run concurrently. VMs 120a-n, in one example, are referred to as compute resources that execute a workload, such as Web applications, etc.

The hypervisor architecture may vary. In some embodiments, virtualization software can be installed as system-level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system-level software as well as a "Domain 0" or "Root Partition" virtual machine, which is a privileged machine that has access to the physical hardware resources of the host. Although parts of the disclosure are described with reference to VMs, the teachings herein also apply to other types of VCIs, such as containers, Docker containers, data compute nodes, isolated user-space instances, namespace containers, and the like.

Host 105 may be constructed on a server-grade hardware platform 106, such as an x86 architecture platform. Hardware platform 106 of host 105 may include components of a computing device such as one or more processors (CPUs) 108, system memory 110, physical network interface controller (PNIC) 112, storage system 114, a local host bus adapter (HBA) 115, and other I/O devices such as, for example, USB interfaces (not shown). Each CPU 108 is configured to execute instructions, for example, instructions that perform one or more operations described herein and that are stored in system memory 110 and in storage system 114. PNIC 112 enables host 105 to communicate with other devices via a communication medium, such as the links in network 146 that connect hosts in data center 102 and/or an external network.

Storage system 114 represents local persistent storage devices (e.g., one or more hard disks, flash memory modules, solid-state disks, and/or optical disks). Host bus adapter (HBA) 115 couples host 105 to one or more external storage networks (not shown), such as a storage area network (SAN) or distributed virtual SAN. Other external storage networks that may be used include network-attached storage (NAS) and other network data storage systems, which are accessible via PNIC 112. System memory 110 is hardware for storing and retrieving information, such as executable instructions, configurations, and other data. System memory 110 contains programs and data when CPUs 108 are actively using them. System memory 110 may be volatile memory or non-volatile memory.

As stated above, FIG. 1 shows host 105 in a state that is illustrative of host 105 being configured with an SDN solution. Configuring host 105 with an SDN solution allows VMs 120 to communicate as part of logical overlay networks which are logical networks that use a packet encapsulation technology, such as VXLAN, to decouple links from the underlying physical network infrastructure and which may span multiple hosts located within data center 102 or outside of data center 102. Configuring host 105 with the SDN solution involves the deployment of a number of components, such as SDN Manager 131 and SDN controller 132, among other components that are not shown.

SDN Manager 131 implements management plane functions and may be one of multiple SDN managers executing on various hosts in data center 102 that together implement the functions of the management plane in a distributed manner. SDN controller 132 implements control plane functions and may be one of multiple SDN controllers executing on various hosts in data center 102 that together implement the functions of the control plane in a distributed manner. In certain aspects, an SDN manager and an SDN controller may execute as processes on different VMs, as shown in FIG. 1 and on the same or different hosts. In some embodiments, both SDN Manager 131 and SDN controller 132 can execute as processes in a single SDN virtual appliance (VA), say SDN VA 128, which is an example of a management VA that is configured to run such components.

A gateway device provides VMs 120*a*-*n* on host 105 and other components in data center 102 with connectivity to a network (not shown) that is external to data center 102 (e.g., a direct link, a local area network (LAN), a wide area network (WAN) such as the Internet, another type of network, or a combination of these). For example, the gateway device may manage external public IP addresses for VMs 120 and route incoming traffic to and outgoing traffic from data center 102. The gateway device may also provide other networking services, such as firewalls (e.g., distributed firewall DFW 152), network address translation (NAT), dynamic host configuration protocol (DHCP), and load balancing. In the example of FIG. 1, the gateway device is implemented as a VCI (e.g., VM), that is configured to execute on host 105, which is shown as edge services gateway (ESG) VM 136. It should be noted that ESG VM 136, though shown on the same host as SDN Manager 131 and SDN controller 132 in FIG. 1, may be on a different host.

Hypervisor 116 includes a virtual router 119, one or more virtual switches 118, a local control plane (LCP) 122 and optionally, a firewall 150, which may be configured to apply firewall rules to packets at virtual switch 118 and/or virtual router 119.

Virtual router 119 and virtual switch(es) 118 are modules in hypervisor 116 that serve as software-based interfaces between PNIC 112 and other physical resources available on host 105 and a number of components including SDN virtual appliances 128, 129, ESG VM 136, VMs 120*a*-*n*, and/or other management VAs (not shown). In some embodiments, virtual router 119 and/or virtual switch(es) 118 are distributed virtual routers and/or distributed virtual switches. As a distributed entity, multiple instances of the distributed virtual router/switch on multiple hosts may be configured and managed as a single router or switch. Each instance may be connected to a different PNIC 112. For example, the distributed virtual router/switch implemented on each host may share the same configuration across each host on which the distributed virtual router/switch is configured, and share state. The term, "virtual switch", is used herein to refer to both non-distributed virtual switches and distributed virtual switches and instances thereof. The term, "virtual router" is used herein to refer to both non-distributed virtual routers and distributed virtual routers and instances thereof.

In some embodiments, services such as intrusion detection services (IDSs), may be provided in DFW 152, in firewall 150 in hypervisor 116, or in one of the appliances 128*a*-*n*. In some embodiments, IDSs can be implemented using artificial intelligence, such as convolutional neural networks which are controlled by a control program or controller in the hypervisor 116 or one of the appliances 128*a*-*n*.

Figure 2:
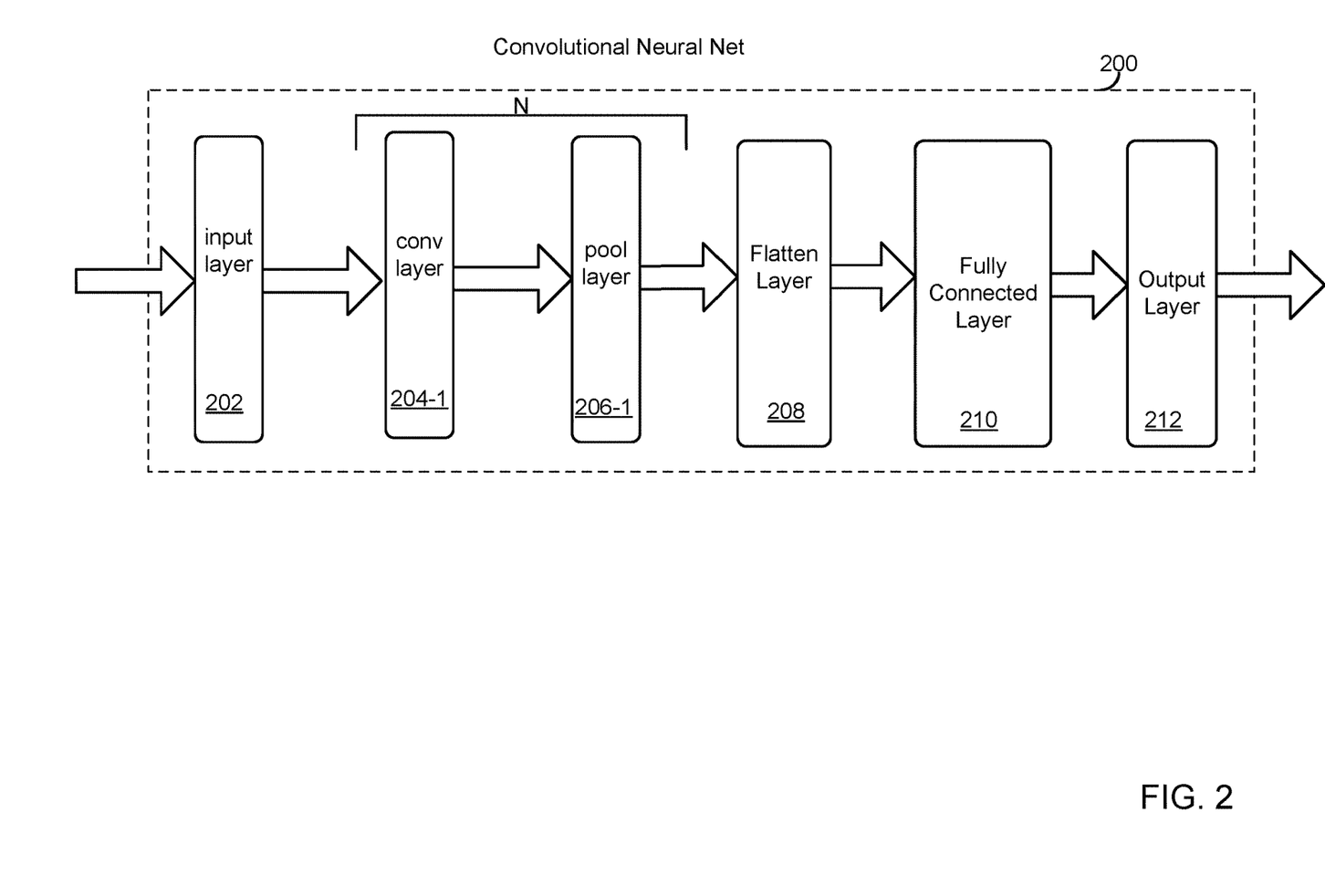
FIG. 2 depicts a representative convolutional neural network (CNN).

FIG. 2 depicts a representative convolutional neural network (CNN) 200. CNN 200 includes an input layer 202, one or more pairs of a convolutional layer 204-1 and a pool layer 206-1, a flatten layer 208, a fully connected layer 210 and an output layer 212.

Input layer 202 is commonly connected to a two-dimensional matrix of values.

Convolutional layer 204-1 includes a set of filter kernels that are applied to the two-dimensional input matrix. A filter kernel is a matrix of numerical values, usually smaller than the two-dimensional input matrix, which operates on the two-dimensional input matrix to generate a single output value. The filter kernel matrix is selected to perform a filtering function to obtain a relevant feature, such as an edge, or gradient orientation, of the two-dimensional input matrix. The filter function matrix operates over the two-dimensional input matrix with a stride, which gives the amount of shift of the filter function matrix of the two-dimensional input matrix for generation of the next output value. The size of the two-dimensional input matrix, the filter kernel and the stride determine the number of output values generated by the convolutional layer.

Pool layer 206-1 takes the output of convolutional layer 204-1 and de-samples the output to reduce the spatial size of the output of convolutional layer 204-1. Pooling returns a single value based on a small pooling matrix (also known as a pooling kernel) over which values of the output of convolutional layer 204-1 are evaluated for output. One common type of pooling is max pooling, in which the output value of the pooling is the maximum value of the convolutional values covered by the pooling matrix. Another type of pooling is average pooling, in which the output is the average of the values covered by the pooling matrix.

When more than one convolutional layer 204-1 and pooling layer 206-1 are used, the network is called a deep CNN (DCNN).

Flatten layer 208 flattens the output of pool layer 206-1 into a column vector, i.e., a column of numerical values.

Fully-connected layer 210 receives and processes the output of flatten layer 208, and commonly includes a rectified linear unit (ReLU) activation function. In some embodiments, the type of activation function can be specified as a parameter for the neural network.

Output layer 212 receives the output of fully-connected layer 210 and includes a number of output nodes, each of which provides a classification of the input to CNN 200. In the output nodes, it is common to use a soft-max activation function, which takes an input vector of K values and normalizes it into a probability distribution of K probabilities proportional to the exponentials of the input numbers. Each output node then represents the probability that the input falls within a class corresponding to the node, so that the knowledge of the CNN represents a probability distribution. An output layer performing these classifications is called a classifier.

Figure 3:
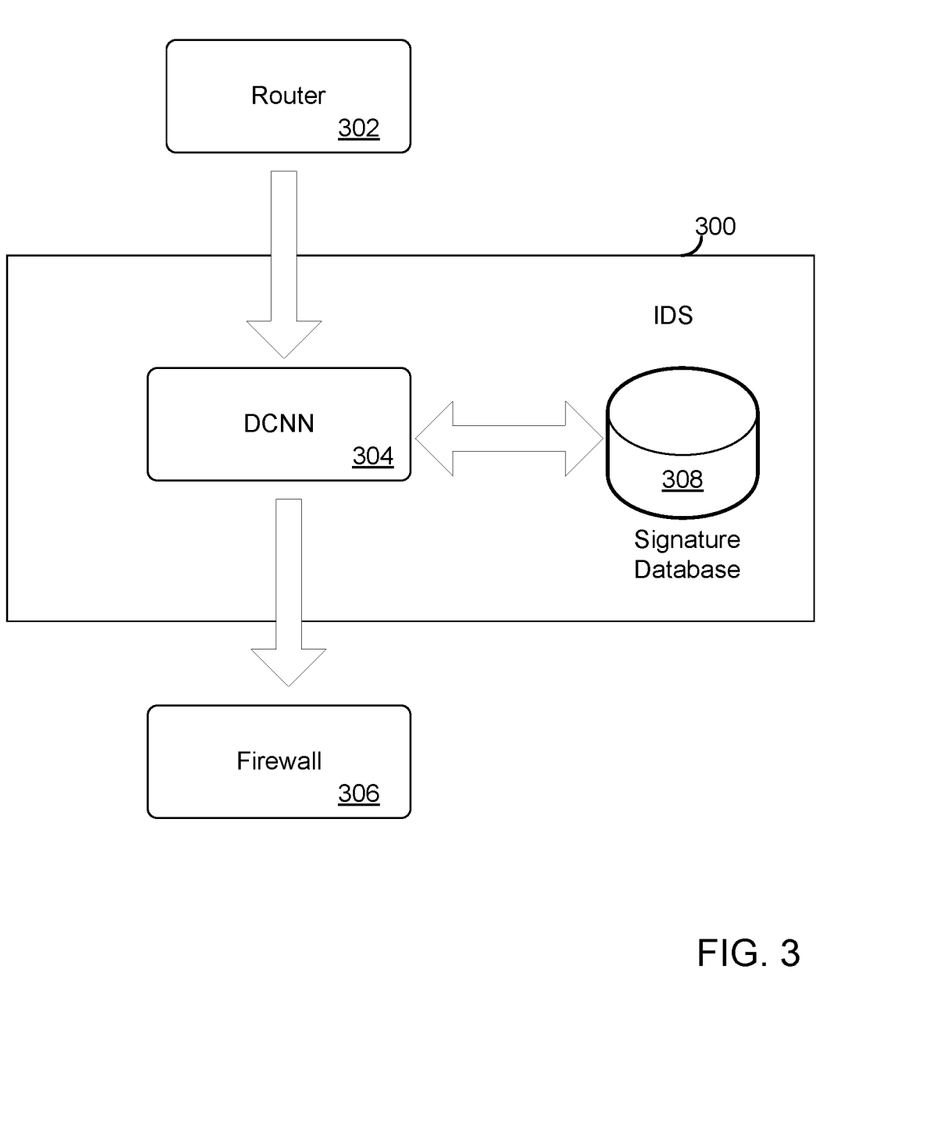
FIG. 3 depicts a block diagram of a deep CNN (DCNN) and signature database for use in an intrusion detection system (IDS).

FIG. 3 depicts a block diagram of a DCNN and signature database for use in an intrusion detection system (IDS). In the figure, a router 302 provides input packets from a network to an IDS 300 with a DCNN 304. The input packets are converted into input strings which are converted into signatures, described below, which are then provided to DCNN 304. DCNN 304, having been trained over the signatures stored in signature database 308, examines the input packets to determine whether or not they should be allowed or blocked at firewall 306.

Signatures that are stored in the database are strings that contain important properties of a received data packet. The strings can be transformed into a numerical representation based on certain properties of the strings. For example, in one embodiment, the properties of the string are (1) a string ID, which is a checksum of the string, (2) a regular expression that is used to filter the string among a plurality of strings, and (3) a class-type for the string. In one embodiment, each of these properties is converted into a numerical representation by computing respectively (1) the natural log of checksum of the string, (2) the natural log of the hash of the regular expression, and (3) a mapping of the class-type to an integer. In one example, the log of the checksum ranges from 0-30, the natural log of the hash of the string ranges from 6.0 to 9.0 and the integers for the class type range from 34-38. Thus, a tuple of (12, 9, 35) is a point in a three-dimensional space and is a mathematical representation of a signature that is distinguishable from many thousands of other points in the same space, thus allowing strings that represent attacks to be distinguished from strings that are safe.

Figure 4A:
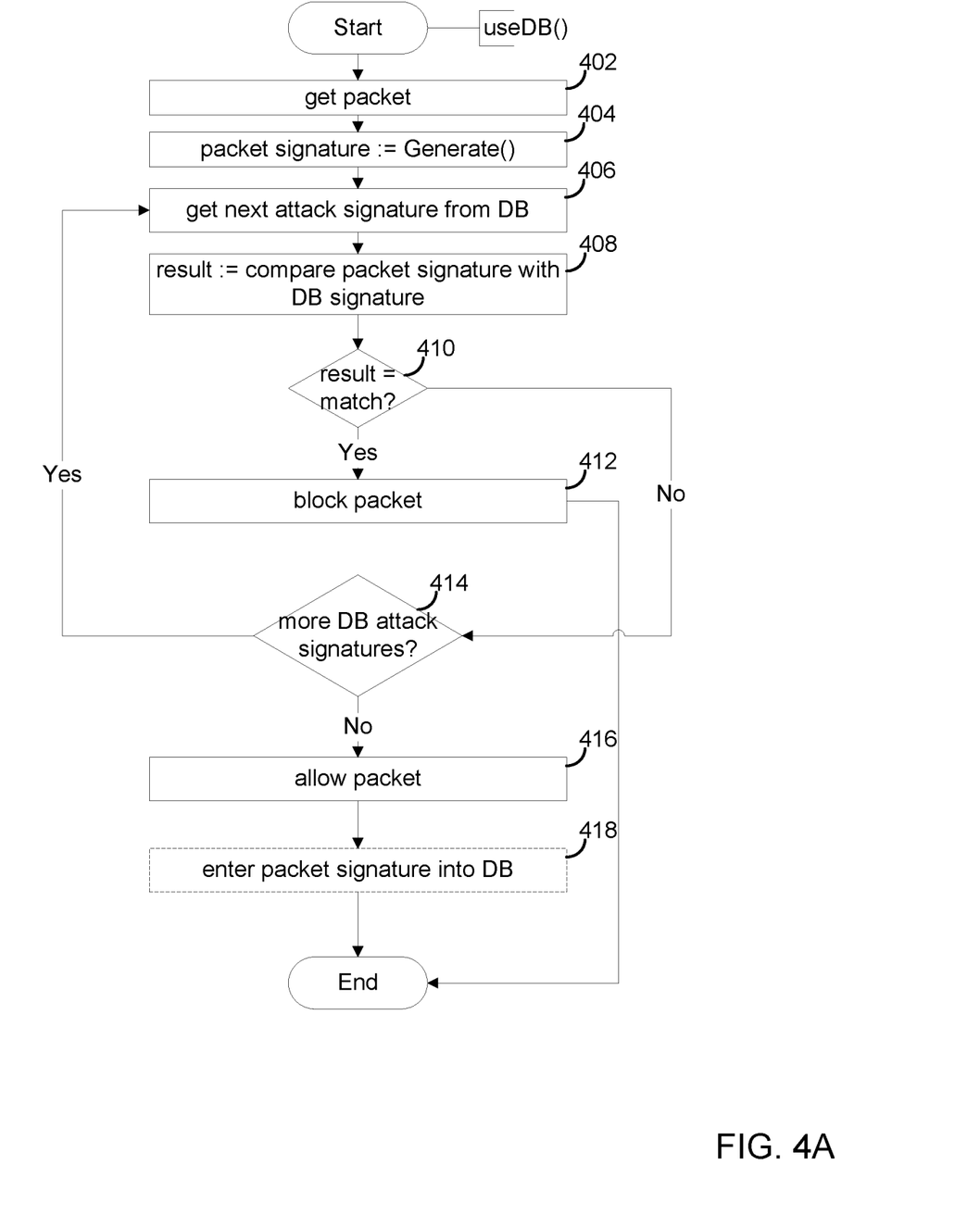
FIG. 4A depicts a flow of operations for using a database of signatures to perform intrusion detection.

FIG. 4A depicts a flow of operations for using a database of signatures to perform intrusion detection. Database 308 contains a set of signatures, some of which are signatures that indicate an attack and others of which are not attacks. In step 402 of the figure, IDS 300 obtains an incoming data packet, and in step 404 generates a packet signature from the data packet, where the signature, in an embodiment, is the above-described tuple. In step 406, IDS 300 obtains the next attack signature in database 308 and in step 408, compares the attack signature against the packet signature. If, as determined in step 408, there is a match, then in step 412 IDS 300 blocks the packet. If, as determined in step 408, there is no match, then if there are more attack signatures to examine in database 308 as determined in step 414, IDS 300 returns to step 406 to obtain the next attack signature and again perform steps 408, 410 until either a matching attack signature is found or there are no more attack signatures to examine. If there are not more attack signatures to examine and no attack signature has been found, as determined in step 414, then IDS 300 allows the packet to go forward in step 416. Optionally, IDS 300 may enter the packet signature of the allowable packet into database 308 marked as a safe signature at step 418. Checking a packet against every signature in the database may take an inordinate amount of time. An alternative is to use a DCNN to check an incoming packet.

Figure 4B:
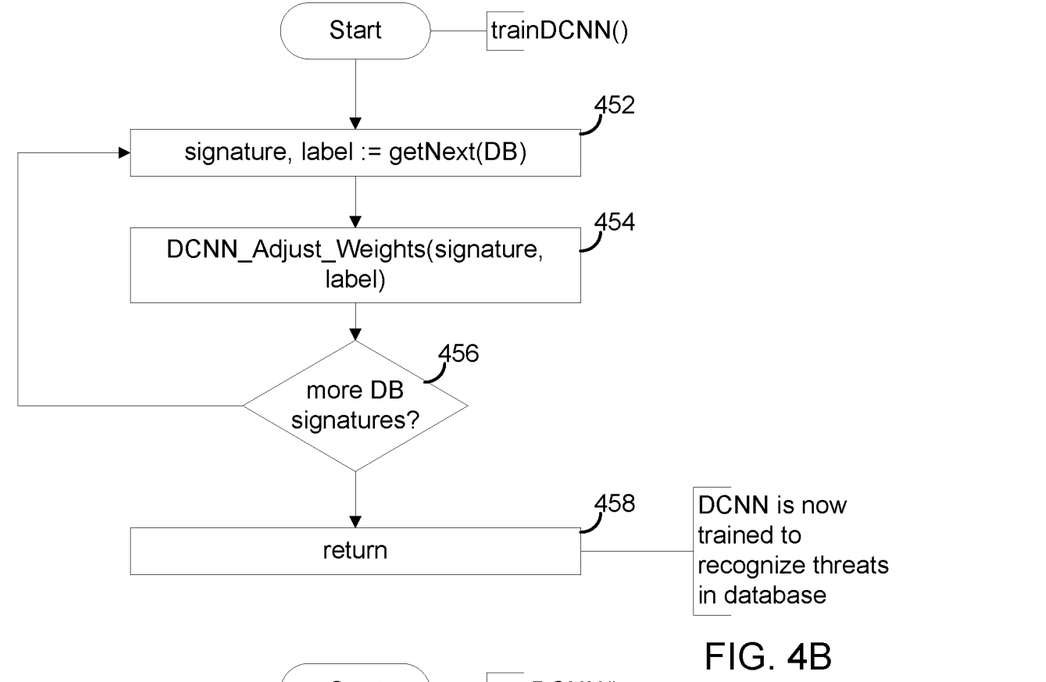
FIG. 4B depicts a flow of operations for training a DCNN for use in an intrusion detection system.

FIG. 4B depicts a flow of operations for training a DCNN for use in an intrusion detection system. When using a DCNN 304 in an intrusion detection system, DCNN 304 is trained using database 308, which contains safe and attack signatures. DCNN 304 is trained according to steps 452-458. In step 452, IDS 300 obtains from database 308 a signature and a label, where the label indicates whether the signature is a safe or an attack signature. In step 454, IDS 300 uses the signature and label, in supervised learning, to train DCNN 304 by adjusting the weights of DCNN 304. In step 456, IDS 300 determines whether there are more database signatures to examine for training DCNN 304. If so, as determined in step 456, the process repeats steps 452 and 454 until DCNN 304 can accurately distinguish between an attack signature and a safe signature. When there are no more database signatures, the IDS 300 returns in step 458. The training of DCNN 304 is captured by the set of weights for all of the perceptrons in DCNN 304 and gradients in the gradient descent function of the learning equation during training. In an embodiment in which DCNN 304 generates probabilities, the training of DCNN 304 represents the probability distribution of the signatures.

Figure 4C:
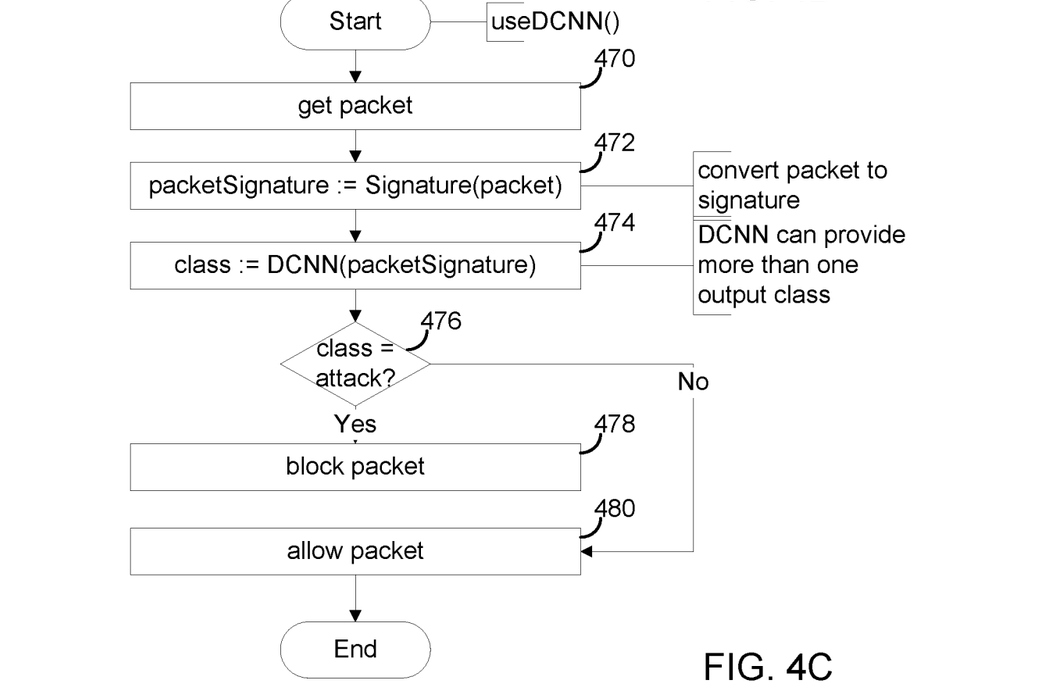
FIG. 4C depicts a flow of operations for using a trained DCNN in an intrusion detection system.

FIG. 4C depicts a flow of operations for using a trained DCNN in an intrusion detection system. After DCNN 304 is trained using database 308, DCNN 304 can be used by IDS 300 to determine whether an incoming data packet is a safe one or not, according to steps 470-480. In step 470, IDS 300 gets the incoming data packet, and in step 472 generates a packet signature from the packet. In an embodiment, the packet signature is a tuple, as described above. In step 472, IDS 300 applies the packet signature to trained DCNN 304, which generates an output classification or probability for the packet signature. If properly trained, DCNN 304 output accurately indicates that the incoming packet has either a safe signature or an attack signature or the probability thereof. If, as determined in step 476, the incoming packet has an attack signature, then IDS 300 blocks the data packet in step 478. Otherwise, it allows the packet to go through in step 480. Optionally, the output of DCNN 304 can classify the incoming packet into more than one class in step 474, and in step 476, determine, based on a subset (i.e., a group) of those classes, whether the packet is an attack packet or not.

Figure 5:
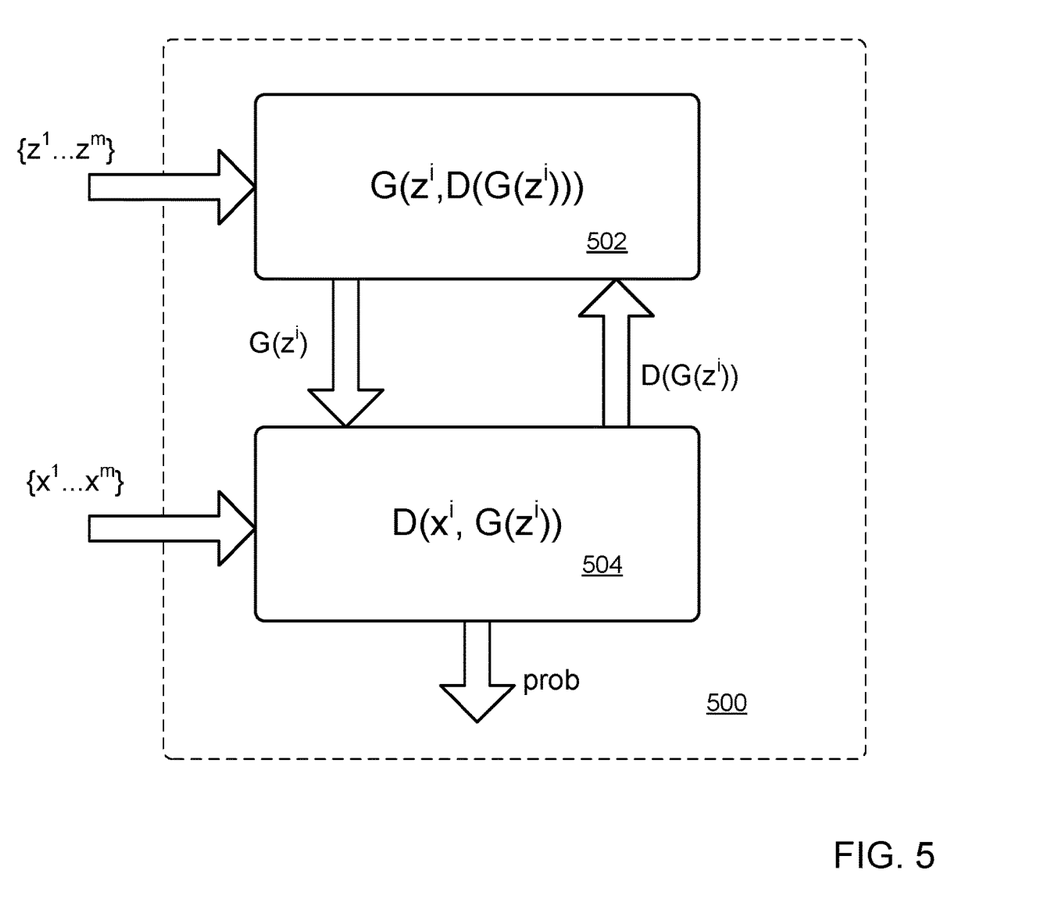
FIG. 5 depicts a block diagram of a generative adversarial neural network (GANN).

FIG. 5 depicts a block diagram for an example generative adversarial neural network (GANN). GANN 500 includes a generator 502 and a discriminator 504. Generator 502 receives samples $(z^1 \ldots z^m)$ from a random distribution $p_g$ and the output $D(G(z^i))$ of discriminator 504. Discriminator 504 receives data samples ($x^1 \ldots x^m$) from an actual data stream $p_{data}$ and the output $G(z^i)$ of generator 502 and generates a probability that the samples are from the random distribution or from the actual data stream. In an embodiment, both generator 502 and discriminator 504 are implemented as DCNNs, such as DCNN 200 depicted in FIG. 2, in which case the GANN becomes a DCGANN.

Training a generator 502 and a discriminator 504 in a GANN 500 requires first training discriminator 504 over many steps with samples ($z^1 \ldots z^m$) from a random distribution $p_g$ and samples ($x^1 \ldots x^m$) from an actual data stream $p_{data}$ and a current output $D(G(z^i))$ of generator 502. After discriminator 504 is sufficiently trained, generator 502 is then trained using the output $D(G(z^i))$ of discriminator 504, and the entire process is repeated with new samples.

Once trained, generator 502 classifies the input samples ($x^1 \ldots x^m$) and the random distribution samples ($z^1 \ldots z^m$) with equal probability because the trained generator mimics the input distribution. At the point of optimal training, generator 502 generates a probability distribution $p_g$ that matches the distribution of the data, $p_{data}$. Thus, generator 502 becomes a good estimator of the data distribution, $p_{data}$, and the output of discriminator 504 for either $p_g$ or $p_{data}$ equals ½. In other words, knowledge of generator 502 carries the probability distribution of the data.

Figure 6:
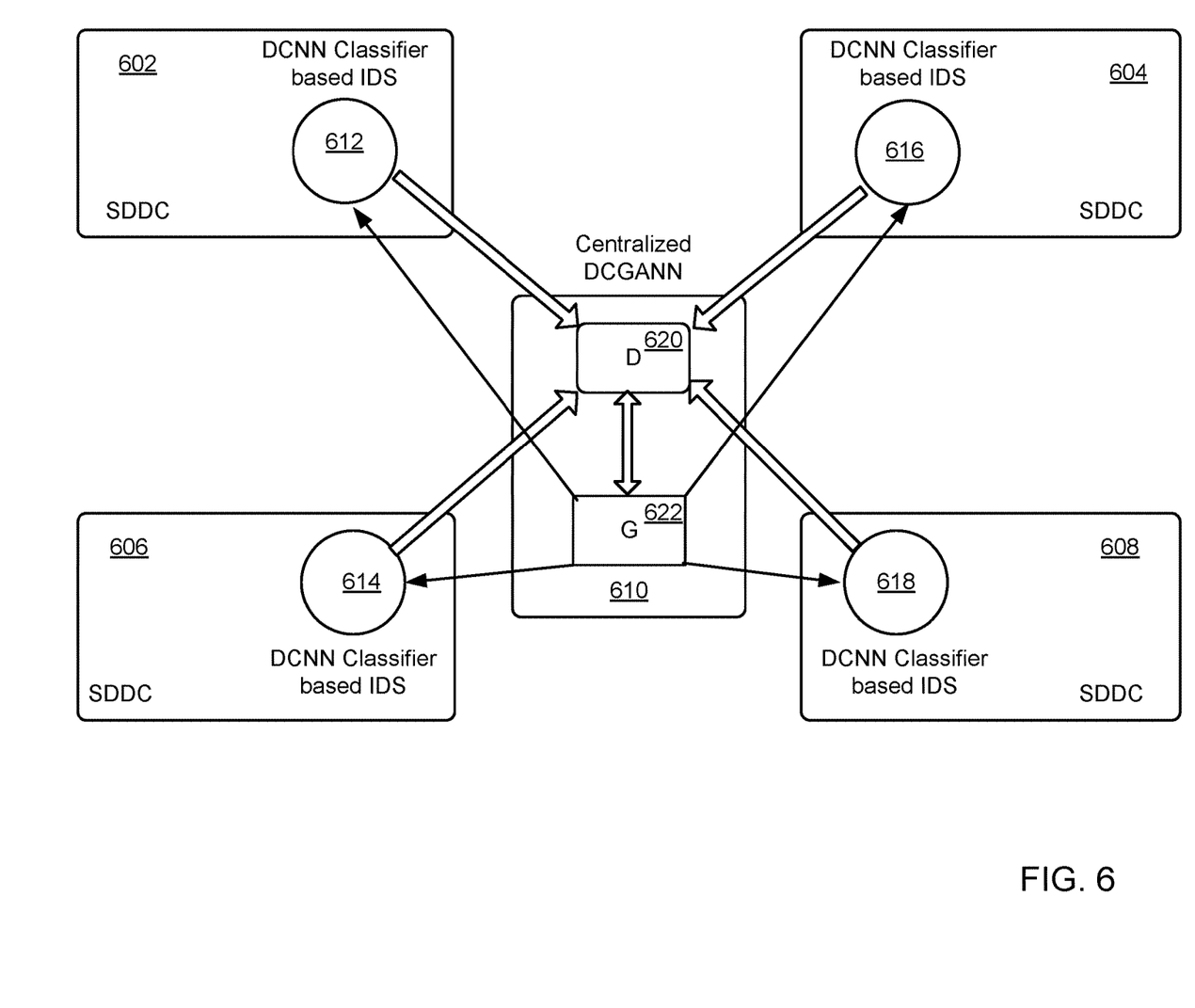
FIG. 6 depicts a block diagram of several SDDCs with IDSs connected to a centralized DCGANN, in an embodiment.

FIG. 6 depicts a block diagram of several SDDCs with IDSs connected to a centralized DCGANN, in an embodiment. In the figure, there are four SDDCs, such as SDDC 102 in FIG. 1, each of which has an IDS with an independent DCNN 612, 614, 616, 618 for data packets that it has encountered. Centralized DCGANN 610 has a discriminator as described above, but the discriminator is a multi-feed discriminator 620 that receives the knowledge of each DCNN 612, 614, 616, 618. In one embodiment, this requires transferring the knowledge of each DCNN 612, 614, 616, 618 to multi-feed discriminator 620. Multi-feed discriminator 620 then interacts with generator 622 to train the generator so that the knowledge of generator 622 is a good estimator of the combined knowledge of each independent DCNN 612, 614, 616, 618 captured by the multi-feed discriminator 620. That is, generator 622 contains the combined knowledge of each DCNN 612, 614, 616, 618.

As mentioned, training generator 622 in the DCGANN requires transferring knowledge from one neural network to another neural network. There are several ways to transfer knowledge between neural networks. In multi-task learning (MTL), the neural network is simultaneously trained in several related tasks. In knowledge based cascade correlation (KBCC), the topology of the neural net is allowed to change as learning occurs.

For DCNNs, one technique takes advantage of the separate convolutional of the DCNN. These convolutional layers contain feature maps that represent the presence of a particular local feature or combination of features, with the lower convolutional layers corresponding to more simple features and the higher level convolutional layers corresponding to high-level features. Thus, one knowledge transfer technique treats the lower convolutional layers as having fixed weights and adds information to only the upper convolutional layers by changing the weights of the upper layers. Having fixed weights on the lower layers means that the neural network has a starting point in which it has already learned a basic set of features and is called upon to learn new combinations of those features by altering the weights (i.e., direct parameters) of the upper layers. Moreover, learning new combinations of lower level features is additive, in that the new learning adds to the learning of the neural network without upsetting the previous learning.

Another technique, automated machine learning (AutoML), focuses on the parameters other than the weights in the layers of the network and optimizes them. Such parameters, called hyper-parameters, include feature selection, activation functions, the gradient descent function, and the learning rate. In this technique, AutoML transfers knowledge of one neural network (source neural network) to another neural network by selecting one or more of these hyper-parameters from the source neural network and using them in the other neural network.

In particular, the gradient descent function is useful for capturing and transferring the knowledge from one neural network to another network. The gradient descent function arises in a learning equation when attempting to minimize the loss function for the network, where the loss function represents the error in the output of the neural network during training of the network. A stochastic gradient descent function arises in a stochastic learning equation when attempting to minimize a stochastic loss function for the network where the input data has a temporal average that is the same as the average over a probability distribution. For example, in the learning equations, $$w' = w - \frac{\eta}{m} * \nabla C_w X_j \quad (1)$$

$$b' = b - \frac{\eta}{m} * \nabla C_b X_j \quad (2)$$

the quantity $\nabla C(w, b)$ is the gradient of the loss function $C(w, b)$. In equation (1), the gradient is used to determine the new model parameters (weights) and in equation (2), the gradient is used to determine the new model biases, where $\eta$ is the learning rate, m is the batch size of the training set and $X_j$ is the observed data value. The gradient $\nabla C_w(w, b)$ can be represented as $$\left(\frac{\partial c}{\partial(w)}, \ldots, \frac{\partial c}{\partial(w)}\right)^T,$$

where T is the transpose operation. (A similar relationship applies for $\nabla C_b(w, b)$). The quantities $$\left(\frac{\partial c}{\partial(w)}, \ldots, \frac{\partial c}{\partial(w)}\right)$$

can be shared among neural networks as an array of floating-point numbers.

Figure 7A:
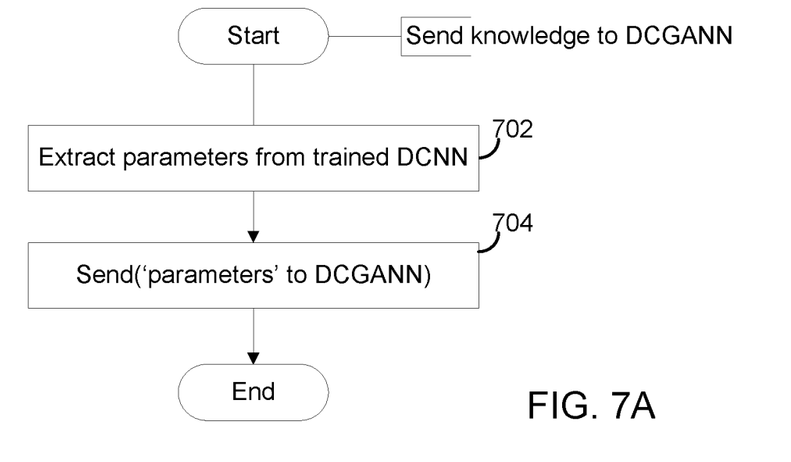
FIG. 7A depicts a flow of operations at the DCNN for transferring knowledge to the DCGANN, in an embodiment.
Figure 7B:
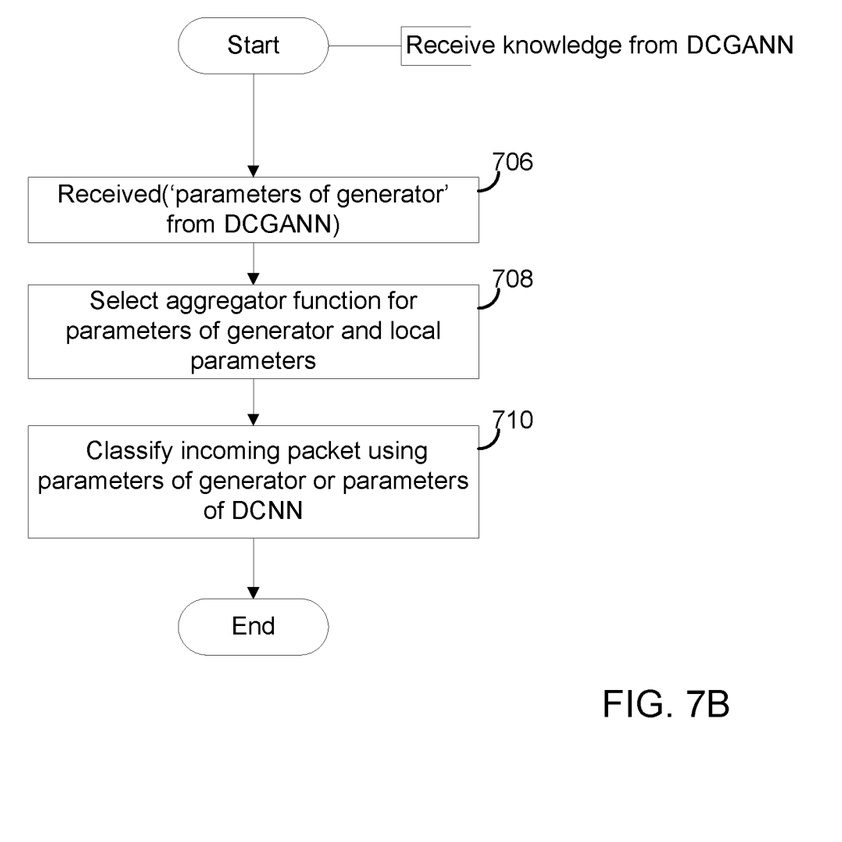
FIG. 7B depicts a flow of operations for a DCNN receiving knowledge from the DCGANN, in an embodiment.
Figure 8:
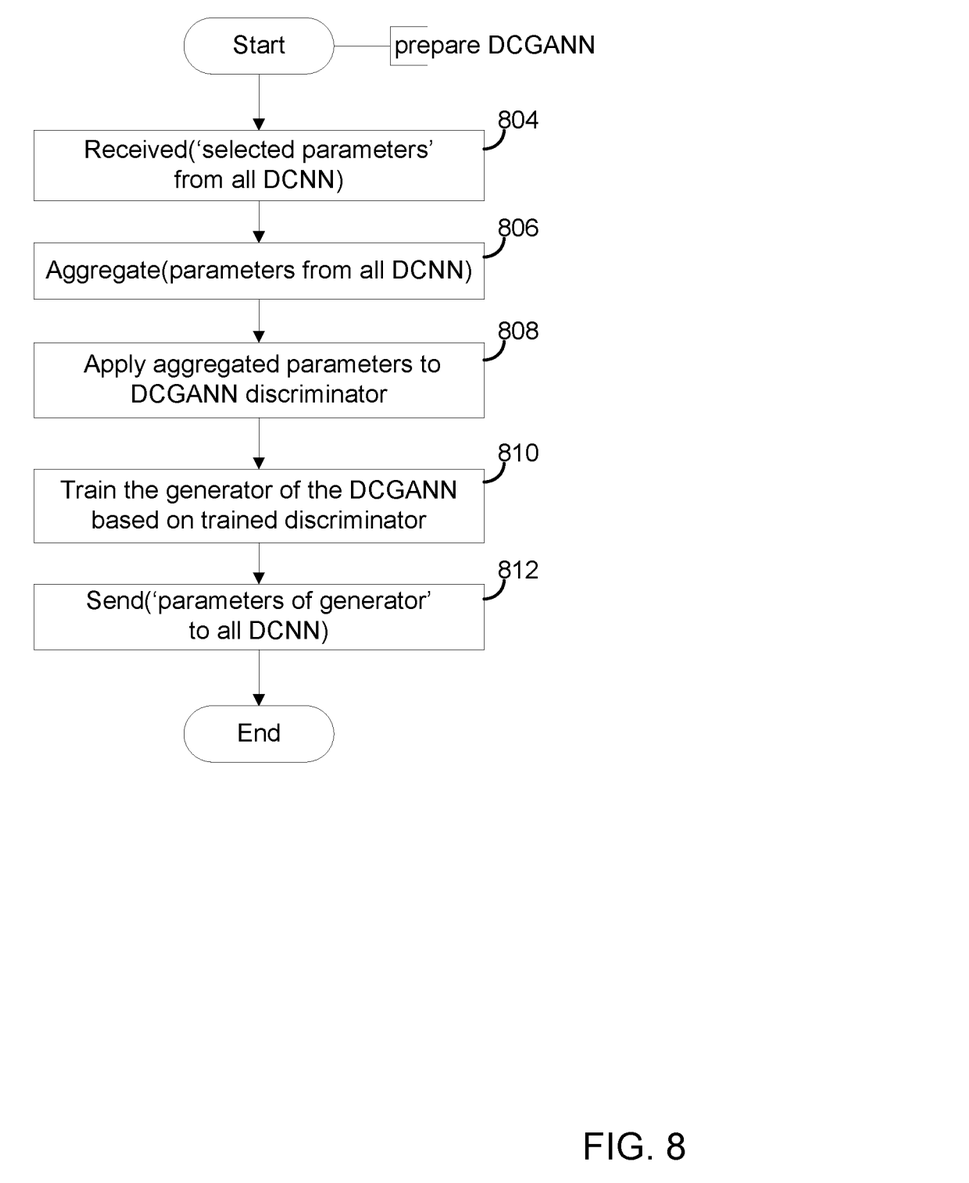
FIG. 8 depicts a flow of operations at the DCGANN for receiving knowledge from all of the DCNNs and transferring knowledge back to each DCNN, in an embodiment.

Operation of the arrangement depicted in FIG. 6 is described in reference to FIGS. 7A, 7B, and 8.

FIG. 7A depicts a flow of operations at the DCNN for transferring knowledge to the DCGANN, in an embodiment. In step 702, a DCNN controller, such as a control program in one of the virtual machines 120a-n, 128a-n, 136 or the hypervisor 116, tracks parameters from a trained DCNN. In step 704, the DCNN controller sends the parameters to DCGANN 610. In one embodiment, the parameters are components of the gradient vector $\nabla C_l$ used in training each DCNN 612, 614, 616, 618 and the DCNN controller sends components of the gradient vector $\nabla C_l$ to the DCGANN 610 as an array of floating-point numbers.

FIG. 7B depicts a flow of operations for a DCNN receiving knowledge from the DCGANN, in an embodiment. In step 706, DCNN 612, 614, 616, 618 receives parameters from generator 622 of DCGANN 610. On one embodiment, the parameters are included in an array representing a gradient vector $\nabla C_g$ for the trained generator in DCGANN 610. In step 708, the DCNN controller selects an aggregator function β which is applied to the gradient vector $\nabla C_g$ received for the trained generator 622 and the local gradient vector $\nabla C_l$ of DCNN 612, 614, 616, 618 to generate a resultant gradient vector $\nabla C_r$ for DCNNs 612, 614, 616, 618. In an embodiment, the aggregator function β is a linear average, but other more complex aggregators can be used. In step 710, the DCNN controller then classifies incoming data packets using the aggregate of the parameters of the generator and DCNN 612, 614, 616, 618 itself. In the embodiment, in which the parameters are gradients, the DCNN controller uses the resultant gradient vector $\nabla C_r$ to classify the incoming packets.

FIG. 8 depicts a flow of operations at the DCGANN for receiving knowledge from all of the DCNNs and transferring knowledge back to each DCNN 612, 614, 616, 618 in an embodiment. In step 804, the DCGANN controller, such as a control program in one of the virtual machines 120a-n, 128a-n, 136, receives selected parameters from all of the DCNNs 612, 614, 616, 618. In one embodiment, the selected parameters are included in an array of floating-point numbers representing the gradient vector $\nabla C_l$ of each DCNN 612, 614, 616, 618, where l ranges from 1 to the total number of DCNNs. In step 806, the DCGANN controller applies an aggregator function α to the parameters from all of the DCNNs 612, 614, 616, 618. In one embodiment, the aggregator function is applied to the gradient vectors $\nabla C_l$ of each DCNN 612, 614, 616, 618 and the aggregator function α is a linear average, but other more complex aggregator functions can be used. In step 808, the aggregated parameters are applied to multi-feed discriminator 620 along with a training set to train multi-feed discriminator 620 of DCGANN 610. In step 810, after multi-feed discriminator 620 is trained, generator 622 of DCGANN 610 is trained using multi-feed discriminator 620. In step 812, the DCGANN controller sends the parameters of the trained generator 622 back to all of the DCNNs 612, 614, 616, 618 from which it received information. In one embodiment, the parameters are those of a gradient vector $\nabla C_g$ for generator 622, which are sent back in the form of an array of floating-point numbers.

Thus, according to the above embodiments, a collaborative intrusion detection system is formed by applying the local knowledge of DCNNs in IDSs at a number of SDDCs in a region to a multi-feed DCGANN. The multi-feed DCGANN then contains the collective knowledge of each of the DCNNs and that collective knowledge is then provided back to each of the DCNNs. Each DCNN thus possesses its local knowledge as well as the knowledge of multiple other IDS sites within a region. In this manner, a comprehensive attack, such as a distributed denial of service, on all of the SDDCs in the region can be detected and/or prevented because the IDS in each of the SDDCs has knowledge of all of the IDSs in the region.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, solid-state drive (flash memory device), phase change memory, persistent memory, network-attached storage (NAS), read-only memory, random-access memory, a CD (Compact Discs)-CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for distributing knowledge of intrusion attacks derived from a plurality of software defined data centers (SDDCs) in a given region, each of the plurality of SDDCs in the given region having a respective convolutional neural network (CNN), the plurality of SDDCs in the given region being linked to each other, the method comprising:

transferring knowledge derived from training of the respective CNN of each of the plurality of SDDCs in the given region to a centralized generative adversarial neural network (GANN) for the given region that includes a discriminator and a generator, wherein the respective CNN of each of the plurality of SDDCs in the given region is trained with intrusion signatures available to the respective CNN based on local intrusion attacks at an SDDC of the plurality of SDDCs in the given region that is associated with the respective CNN, and wherein the discriminator of the GANN receives the knowledge of the respective CNN of each of the plurality of SDDCs in the given region and trains the generator of the GANN;

receiving and transferring knowledge in the generator of the centralized GANN to the respective CNN of each of the plurality of SDDCs in the given region, wherein the respective CNN of each of the plurality of SDDCs in the given region can use either knowledge derived from its training or the received knowledge from the generator to perform intrusion detection and prevention of incoming data packets; and detecting, by the respective CNN of a given SDDC of the plurality of SDDCs in the given region, a distributed attack targeting multiple SDDCs of the plurality of SDDCs in the given region based on the received knowledge from the generator.

2. The method of claim 1, wherein the respective CNN of each of the plurality of SDDCs in the given region has an output stage that ascribes to a signature a probability that the signature is an attack.

3. The method of claim 1, wherein an intrusion signature is a string that is converted to a tuple that is a mathematical representation of (a) a checksum of the string, (b) a regular expression that selects the string, and (c) a class type of the string; and wherein intrusion signature distributions of each the respective CNN of each of the plurality of SDDCs in the given region are derived from the mathematical representation of the intrusion signatures derived from the incoming data packets.

4. The method of claim 3, wherein the mathematical representation of the checksum is a logarithm of the checksum.

5. The method of claim 3, wherein the mathematical representation of the regular expression is a logarithm of a hash of the regular expression.

6. The method of claim 3, wherein the mathematical representation of the regular expression is a mapping of the class type to an integer.

7. The method of claim 1, wherein the respective CNN of each of the plurality of SDDCs in the given region is characterized by a gradient descent function; and wherein the transferring of the knowledge derived from training of the respective CNN of each of the plurality of SDDCs in the given region to the GANN includes optimizing parameters of the GANN using the gradient descent function of the respective CNN of each of the plurality of SDDCs in the given region.

8. The method of claim 7, wherein the optimizing of the parameters of the GANN using the gradient descent function of the respective CNN of each of the plurality of SDDCs in the given region includes aggregating the gradient descent functions from the respective CNN of each of the plurality of SDDCs in the given region.

9. An SDDC in a plurality of software defined data centers (SDDCs) in a given region, each including one or more processors and an intrusion detection system (IDS) containing a respective convolutional neural network (CNN), the plurality of SDDCs in the given region being linked to each other, each IDS being configured to:

transfer knowledge derived from training of the respective CNN of each of the plurality of SDDCs in the given region to a centralized generative adversarial neural network (GANN) for the given region that includes a discriminator and a generator, wherein the respective CNN of each of the plurality of SDDCs in the given region is trained with intrusion signatures available to the respective CNN based on local intrusion attacks at an SDDC of the plurality of SDDCs in the given region that is associated with the respective CNN, and wherein the discriminator of the GANN receives the knowledge of the respective CNN of each of the plurality of SDDCs in the given region and trains the generator of the GANN;

transfer knowledge in the generator of the centralized GANN to the respective CNN of each of the plurality of SDDCs in the given region, wherein the respective CNN of each of the plurality of SDDCs in the given region can use either knowledge derived from its training or the received knowledge from the generator to perform intrusion detection and prevention of incoming data packets; and detect, by the respective CNN of a given SDDC of the plurality of SDDCs in the given region, a distributed attack targeting multiple SDDCs of the plurality of SDDCs in the given region based on the received knowledge from the generator.

10. The SDDC of claim 9, wherein the respective CNN of each of the plurality of SDDCs in the given region has an output stage that ascribes to a signature a probability that the signature is an attack.

11. The SDDC of claim 9,
wherein an intrusion signature is a string that is converted to a tuple that is a mathematical representation of (a) a checksum of the string, (b) a regular expression that selects the string, and (c) a class type of the string; and
wherein intrusion signature distributions of the respective CNN of each of the plurality of SDDCs in the given region are derived from the mathematical representation of the intrusion signatures derived from the incoming data packets.

12. The SDDC of claim 11, wherein the mathematical representation of the checksum is a logarithm of the checksum.

13. The SDDC of claim 11, wherein the mathematical representation of the regular expression is a logarithm of a hash of the regular expression.

14. The SDDC of claim 11, wherein the mathematical representation of the regular expression is a mapping of the class type to an integer.

15. The SDDC of claim 9,
wherein the respective CNN of each of the plurality of SDDCs in the given region is characterized by a gradient descent function; and
wherein the transferring of the knowledge derived from training of the respective CNN of each of the plurality of SDDCs in the given region to the GANN includes being configured to optimize parameters of the GANN using the gradient descent function of the respective CNN of each of the plurality of SDDCs in the given region.

16. A non-transitory computer-readable medium comprising instructions executable in a computer system, wherein the instructions when executed in the computer system cause the computer system to carry out a method for distributing knowledge of intrusion attacks derived from a plurality of software defined data centers (SDDCs) in a given region, each of the plurality of SDDCs in the given region having a respective convolutional neural network (CNN), the plurality of SDDCs in the given region being linked to each other, the method comprising:

transferring knowledge derived from training of the respective CNN of each of the plurality of SDDCs in the given region to a centralized generative adversarial neural network (GANN) for the given region that includes a discriminator and a generator, wherein the respective CNN of each of the plurality of SDDCs in the given region is trained with intrusion signatures available to the respective CNN based on local intrusion attacks at an SDDC of the plurality of SDDCs in the given region that is associated with the respective CNN, and wherein the discriminator of the GANN receives the knowledge of the respective CNN of each of the plurality of SDDCs in the given region and trains the generator of the GANN;

receiving and transferring knowledge in the generator of the centralized GANN to the respective CNN of each of the plurality of SDDCs in the given region, wherein the respective CNN of each of the plurality of SDDCs in the given region can use either knowledge derived from its training or the received knowledge from the generator to perform intrusion detection and prevention of incoming data packets; and detecting, by the respective CNN of a given SDDC of the plurality of SDDCs in the given region, a distributed attack targeting multiple SDDCs of the plurality of SDDCs in the given region based on the received knowledge from the generator.

17. The non-transitory computer-readable medium of claim 16, wherein the respective CNN of each of the plurality of SDDCs in the given region has an output stage that ascribes to a signature a probability that the signature is an attack.

18. The non-transitory computer-readable medium of claim 16,
wherein an intrusion signature is a string that is converted to a tuple that is a mathematical representation of (a) a checksum of the string, (b) a regular expression that selects the string, and (c) a class type of the string; and
wherein intrusion signature distributions of the respective CNN of each of the plurality of SDDCs in the given region are derived from the mathematical representation of the intrusion signatures derived from the incoming data packets.

19. The non-transitory computer-readable medium of claim 18,
wherein the mathematical representation of the checksum is a logarithm of the checksum;
wherein the mathematical representation of the regular expression is a logarithm of a hash of the regular expression; and
wherein the mathematical representation of the regular expression is a mapping of the class type to an integer.

20. The non-transitory computer-readable medium of claim 16,
wherein the respective CNN of each of the plurality of SDDCs in the given region is characterized by a gradient descent function; and
wherein the transferring of the knowledge derived from training of the respective CNN of each of the plurality of SDDCs in the given region to the GANN includes optimizing parameters of the GANN using the gradient descent function from the respective CNN of each of the plurality of SDDCs in the given region.

* * * * *